United States Patent [19]

Sheiman et al.

[11] 4,422,720

[45] * Dec. 27, 1983

[54] STEREOSCOPIC VIEWING AND PROJECTION SYSTEM

[76] Inventors: David M. Sheiman, 1401 Alvarado Ter., Los Angeles, Calif. 90006; Elliot A. Rudell, 2422 Curtis Ave., Redondo Beach, Calif. 90278

[*] Notice: The portion of the term of this patent subsequent to Nov. 25, 1997, has been disclaimed.

[21] Appl. No.: 195,680

[22] Filed: Oct. 9, 1980

Related U.S. Application Data

[63] Continuation-in-part of Ser. No. 920,280, Jun. 29, 1978, Pat. No. 4,235,515, which is a continuation-in-part of Ser. No. 632,224, Nov. 17, 1975, abandoned.

[51] Int. Cl.³ .................. G02B 27/14; G02B 27/24
[52] U.S. Cl. ...................... 350/138; 350/174; 350/286
[58] Field of Search ............... 350/137, 138, 131, 133, 350/144, 286, 173, 174, 452

[56] References Cited

U.S. PATENT DOCUMENTS

| | | | |
|---|---|---|---|
| 2,084,350 | 6/1937 | Land | 350/132 |
| 3,442,569 | 5/1969 | Bonnet | 350/137 |
| 3,450,480 | 6/1969 | Chitayat | 350/137 |
| 3,515,454 | 6/1970 | Paganelli | 350/137 |
| 4,073,569 | 2/1978 | Rizzo | 350/137 |

FOREIGN PATENT DOCUMENTS

| | | | |
|---|---|---|---|
| 576690 | 4/1946 | United Kingdom | 350/137 |
| 711367 | 6/1954 | United Kingdom | 350/137 |

*Primary Examiner*—John K. Corbin
*Assistant Examiner*—Scott J. Sugarman
*Attorney, Agent, or Firm*—Fischer, Tachner & Strauss

[57] ABSTRACT

There is disclosed an image orientation and projection system for use with stereoscopic viewing and projection systems.

The preferred embodiment utilizes a stereoscopic viewing system of one or two prisms, preferably each having a plano face and an opposite face bearing a plurality of spaced-apart, straight and parallel V-grooves. Reflective surfaces are positioned in relation to said prisms to permit the employment of left and right stereoscopic images in their normal (left - right) and unreversed orientation to each other.

31 Claims, 18 Drawing Figures

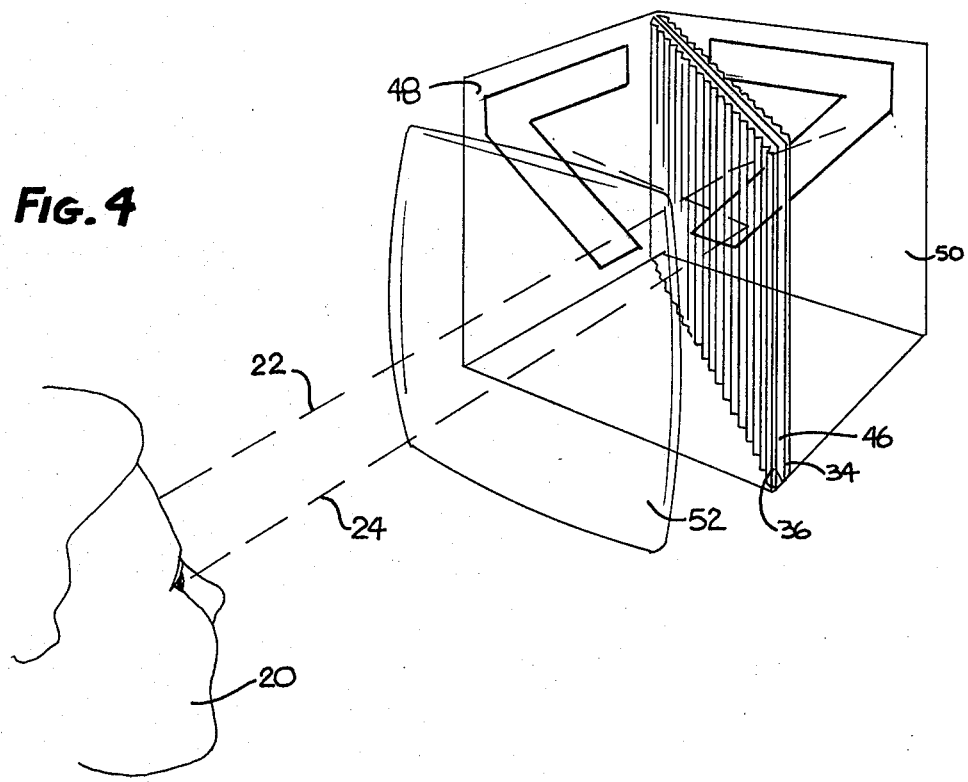
FIG. 4
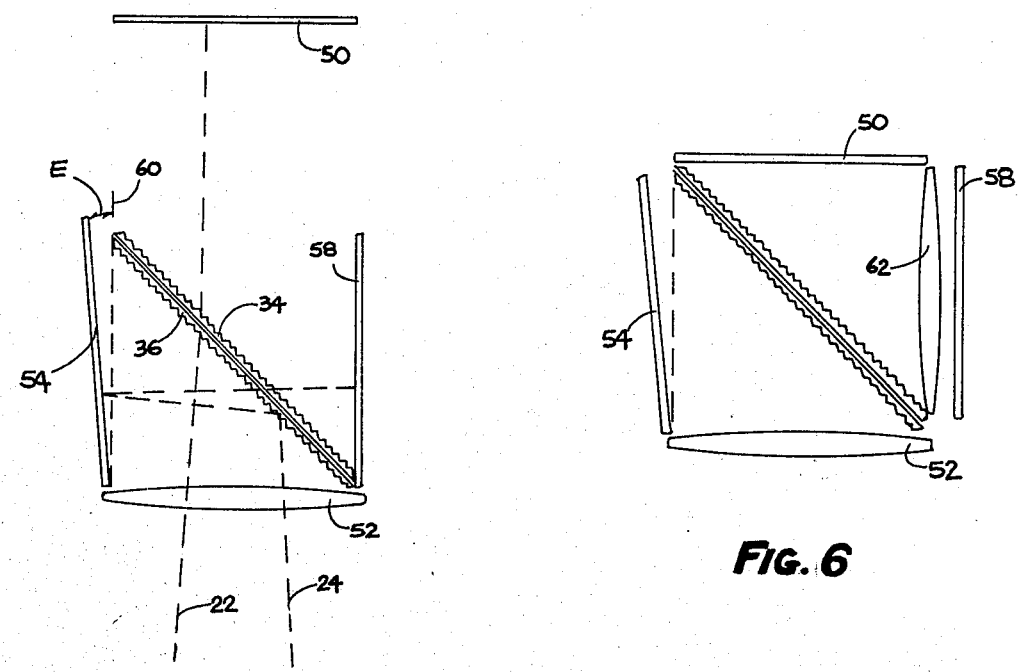
FIG. 5
FIG. 6

STEREOSCOPIC VIEWING AND PROJECTION SYSTEM

REFERENCE TO RELATED APPLICATIONS

This application is a continuation-in-part of our parent application, Ser. No. 920,280, filed on June 29, 1978 now U.S. Pat. No. 4,235,515 which is a continuation-in-part of earlier filed application, Ser. No. 632,224, filed on Nov. 17, 1975 now abandoned.

BACKGROUND OF THE INVENTION

1. Field of the Invention

This invention relates to a system for the display, projection and viewing of stereoscopic images.

2. Brief Statement of the Prior Art

Various techniques have been employed for stereoscopic display and observation of optical images including hand-held viewers in which a separately imaged view of the object is mechanically directed to each of the eyes and, more recently, stereoscopic projection systems employing projectors for directing stereoscopic, image-modulated, parallel beams of polarized light onto a screen viewed by observers wearing special eyeglasses having oculars of polarizing material oriented to different planes and effective to transmit light from its respective image-modulated, polarized light beam.

An ancient patent, U.S. Pat. No. 51,906 of Jan. 2, 1866, discloses a stereoscopic viewing assembly of a massive pair of prisms. This device, while operable, is not practical because of the size and bulk of the device, with a consequential high cost of manufacture, and because the assembly requires backlighted images, e.g., transparencies.

British Pat. No. 711,367 of 1954 by Wilson and Silver discloses an improved projection means for the above-mentioned 1866 patent. Although this patent avoided the use of transparencies, it did not overcome the inherent costs and clumsiness of the 1866 Swan prism system.

The functional operability of the technology of the inventors' earlier application, 920,280, render improvements on image orientation and projection as herein stated feasible and employable for actual usage.

In our parent application we have disclosed and claimed a steroscopic viewing system which uses one or two thin prisms, each having a plano face and an opposite face bearing a plurality of parallel, spaced-apart V-grooves for viewing reversed, right and left, stereoscopic images.

BRIEF STATEMENT OF THE INVENTION

The invention comprises a stereoscopic viewing system utilizing one or a pair of prisms to direct the line of sight from each eye to a respective one of one or two thin prisms having a plano face and an opposite, V-grooved face in which a plurality of parallel and longitudinal V-grooves define a plurality of parallel, longitudinal triangular prisms. It also comprises a combination of reflecting and reducing or magnification means to project a pair of stereoscopic images in their natural, i.e., left-right original orientation, onto two imaging surfaces of the viewing system.

This invention, in permitting the natural, i.e. unreversed side-to-side orientation of the stereoscopic images, allows, for the first time, the employment of unaltered stereoscopic pairs of pictures, and allows for the visual recording of new stereoscopic images without reversing or flopping the images. For purposes of this application, the term "reversing of images" means the positioning of the left image to the right side of the right image (normally, the right image should be on the right, the left image on the left). For purposes of this application, "flopping" means the display of a particular image in backwards orientation, i.e., a mirrored image.

This invention therefore, allows for unaltered employment of the vast library of existing stereoscopic information, the employment of unaltered instant stereoscopic image pairs, and greatly facilitates picture handling in preparation for display within the system by the user.

In the two prism embodiment, a pair of thin and grooved viewing prisms are positioned with their plano surfaces in a back-to-back array and their grooved surfaces facing outwardly. Each V-grooved surface, which provides a plurality of parallel, spaced-apart prisms, is positioned between one of the stereoscopic images and the viewer's respective eye. The stereo effect is achieved since the slight convergence of sight from the viewer's eyes permits an incident angle of view from eye which is within the angle for complete internal reflection of the prisms, permitting the view to be directed toward one of the pair of images, while the view from the other eye is outside the angle for complete internal reflection and is refracted through the prisms and directed to the other of the stereoscopic images. The system, therefore, does not require the viewer to wear any special eye pieces or filters.

BRIEF DESCRIPTION OF THE DRAWINGS

The invention will be described with reference to the Figures of which:

FIG. 4 is a perspective view of FIG. 3.

FIG. 5 illustrates a two prism array, with corrected left/right non-reversed image display employing reflective means.

FIG. 6 illustrates the addition of a magnification lens to correct for image size variance in the FIG. 5 system.

DESCRIPTION OF PREFERRED EMBODIMENTS

Figure 1:
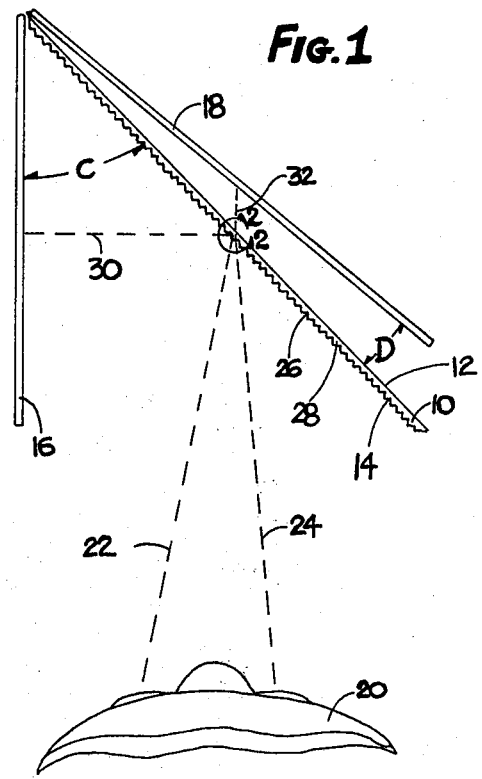
FIG. 1 illustrates a one prism system requiring reversed images with one image flopped.
Figure 2:
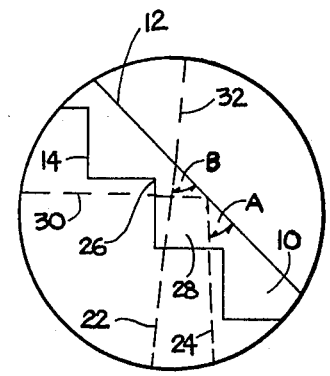
FIG. 2 is an enlarged view of a portion of FIG. 1, illustrating the lines of sight of the viewer.

Referring to FIGS. 1 and 2, a simple, one prism system requiring reversed (and flopped) images, is illustrated. A prism 10 is provided having a flat or plano surface 12 and an opposite grooved face 14. The prism is mounted with one edge coextensive with and intersecting the edges of imaging planes 16 and 18 which provide for imaging of right and left views of a stereoscopic pair of images. Prism 10 has its surface 14 provided with a plurality of longitudinal V-grooves 26 that define therebetween a plurality of parallel, longitudinal, triangular prisms 28, preferably, prisms 28 are disposed, in regular and equal spacing across the surface 14. The stereoscopic display is observed by viewer 20, whose lines of sight are directed onto the grooved surface 14 of the prism 10. The lines of sight of the viewer are shown in broken lines 22 and 24 for the left and right eyes, respectively.

The observer can assume a position with regard to the prism 10 whereby the line of sight 24 from the right eye has an incident angle A (see FIG. 2) with regard to prism 10 which is below the angle for complete internal reflection whereby this line of sight is internally reflected by the plano surface 12 of the lens and exits from the prism along line 30. The line of sight from the opposite eye, broken line 22, however, has an angle B greater than the angle for complete internal reflection and this line of sight is refracted within the prism 10 and exits therefrom along the direction 32.

Referring now to FIG. 1, the line of sight 30 is directed to the right stereoscopic image which is displayed on imaging plane 16 while line of sight 32 is directed to the left stereoscopic image which is displayed on imaging plane 18. Since line of sight 24 is totally internally reflected within prism 10, the imaging plane 16 will be observed by viewer 20 in a flopped manner, i.e., as a mirror image. To correct for this reversal of image orientation, it is necessary for the right stereoscopic view 17 that is positioned on imaging plane 16, to be flopped.

The relative occluded angles of the imaging surfaces with respect to the grooved prism are selected to minimize prism distortion in the single prism system. For this purpose, angle C which is the occluded angle between the grooved surface 14 of prism 10 and the facing imaging plane 16, should be from about 40 degrees to about 60 degrees while angle D, the occluded angle between the plano surface 12 of prism 10 and the facing imaging plane 18, should be from about 1 degree to about 15 degrees.

Figure 3:
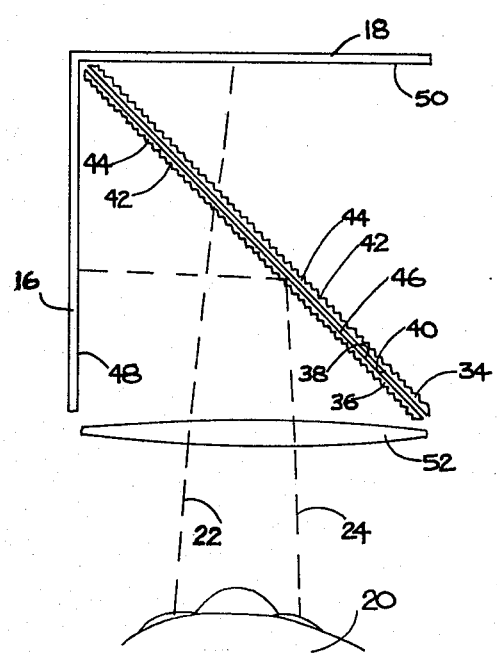
FIG. 3 illustrates a two prism system requiring reversed images with one image flopped.

Referring now to FIG. 3, there is illustrated a two prism embodiment of the stereoscopic system. A pair of thin prisms 34 and 36 are positioned with their plano surfaces 38 and 40 in a back-to-back continuous array. Each thin prism is of the shape previously described with regard to thin prism 10 of FIGS. 1 and 2, and each thin prism has its outer face grooved with a plurality of longitudinal V-grooves 42 which define a plurality of longitudinal, regularly and equally-spaced triangular prisms 44 therebetween. The plano surfaces 38 and 40 of the prisms can be separated by a thin gap 46. If desired, however, these surfaces can be in contact and the stereoscopic effect can still be achieved.

The pair of stereoscopic images 48 and 50 are mounted on the right and left stereoscopic imaging planes 16 and 18 in any suitable fashion. These images can be opaque prints of stereoscopic views or can be transparencies or focused projections from a remote transparency or motion film projector. Image 48 must be a flopped image in order to appear to viewer 20 in correct orientation, for reasons as described with line of sight 24 in FIGS. 1 and 2. In the embodiment of FIG. 3, a magnification lens 52 can be situated between the viewer 20 and the system. This lens widens the field of effective stereoscopic viewing and enlarges the apparent image size.

Lines of sight 22 and 24 from viewer 20 pass through magnification lens 52 and enter prism 36. Due to the slight convergence of sight from the viewer's eyes, the incident angle of views from the viewer's eyes are different as they enter prism 36, and this difference renders the incident angle of the right line of sight 24 sufficient to undergo total internal reflection, while that of the left line of sight 22 is insufficient to effect such internal reflection. Line of sight 22, therefore, is refracted through prism 36, through air gap 40, through prism 34 and towards left stereoscopic image 50. Right line of sight 24 is totally internally reflected in prism array 36 and is directed toward right image 48.

FIG. 4 illustrates a perspective view of the stereoscopic system described in FIG. 3. It can be clearly noted in this view that stereoscopic image 48 is necessarily flopped, in order to appear in a correct orientation to viewer 20. Stereoscopic image 50 is not flopped. It can be observed in FIG. 4 that the stereoscopic images 48 and 50 are necessarily positioned in a reversed order, that is, left image to the right of the right image, in order for the correct image to be viewed by its respective line of sight through the system.

FIG. 5 illustrates a solution to the reversing and flopping inconvenience since left image 50 and right image 58 are in their correct orientation, unreversed and unflopped. Reflective means 54, such as a mirror, is positioned at an angle E of approximately 1 degree to 15 degrees, preferably 10 degrees, beyond imaginary plane 60, which is perpendicular to image 50 and approximately 45 degrees to prisms 34 and 36. Left line of sight 22 travels through magnification lens 52 to stereo image 50, behaving in a manner similar to as described in FIG. 4. Right line of sight 24 undergoes total internal reflection in prism 36 (as described earlier) and is directed onto reflective means 54. Line of sight 24 is now reflected back into prism 36. The slight angle E of reflective means 54 alters the incident angle of reflected line of sight 24 so that it intersects prism 36 at an angle insufficient to once again realize total internal reflection. It is therefore refracted and directed through prism 34 and towards image 58. Left image 50 is positioned a distance from prisms 34 and 36 to provide equal distances of travel of line of sight 22 and line of sight 24. Since both lines of sight are of equal length, the viewer sees a correctly sized stereo image utilizing normal (non-reversed and non-flopped) images 50 and 58.

FIG. 6 illustrates the system of FIG. 5, except with the inclusion of magnification lens 62 to enlarge image 58. This magnification negates the requirement of spacing image 50 apart from the prisms to compensate for differences in the lengths of the lines of sight. Lens 62 thus allows for a compact assembly of the invention.

Alternatively, a reduction lens could be employed in front of image 50 in substitution for magnification lens in front of image 58.

Figure 7:
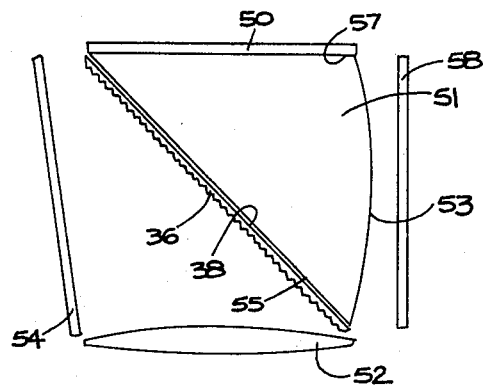
FIG. 7 illustrates the invention of FIG. 6 with the substitution of one solid prism for one thin V-grooved prism.

FIG. 7 illustrates the system of FIG. 6, with the substitution of solid prism 51 for thin grooved prism 34 of FIG. 6. Prism 51, of any suitable clear optical material such as acrylic or quartz, is positioned so that its hypotenuse side 55 is parallel to plano surface 38 of prism array 36. Short side 57 is butted against left imaging surface 50, providing correct spacing and an alignment surface for the left image. Short side 53 of the prism 51 is shown in a convex form. This provides integral magnification, eliminating lens 62 of FIG. 6. The use of a solid prism 51 and a thin grooved prism 36 provide a cost and weight effective arrangement over two solid prisms. More importantly, in an optical arrangement such as described in FIGS. 5, 6, and 7, the repeated travel of lines of sight through the optical elements can effectively be maintained at a higher optical quality by the employment of the one solid prism 51 and one prism array 36.

Figure 8:
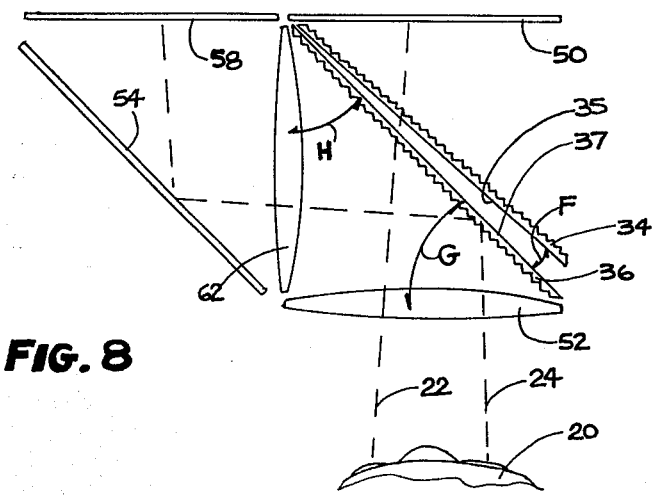
FIG. 8 illustrates a variation of a two prism system for non-flopped images.

FIG. 8 illustrates a viewing system for reversed, but non-flopped images. Left image 50 is positioned behind prisms 34 and 36, and lens 52 in a manner as previously described in FIGS. 3 and 4.

Magnification means in the form of lens 62 is positioned at an occluded angle H of approximately 45 degrees to prism array 36. Reflective means 54 and prism 36 both flop right image 58, resulting in the observance of the image in its correct orientation. Lens 62 increases the size of observed right image 58, compensating for the extended length of travel of the right line of sight 24 as compared to left line of sight 22. Should magnification lens 62 be removed, image size compensation can be attained by remote positioning of image 50, as described previously in FIG. 5.

Continuing with FIG. 8, it can be noted that prism 36 is positioned at an occluded angle G of approximately 45 degrees to the magnification lens 32 and the eyes of the viewer 20. This positioning may vary several degrees in all embodiments as herein stated, depending particularly upon the index of refraction of the material employed in the prism arrays. Prism 34 is not positioned parallel to prism 36 since a variance angle F of approximately 5 degrees between plano surfaces 35 and 37 reduces or eliminates any possible image ghosting which may appear to viewer 20 as a result of any images undergoing total internal reflection within a back-to-back prism array and then bouncing back and forth within the array prior to being viewed by the observer. This improvement can be used with any of the two prisms systems of the invention such as shown in FIGS. 3 to 10, 12 and 15.

Figure 9:
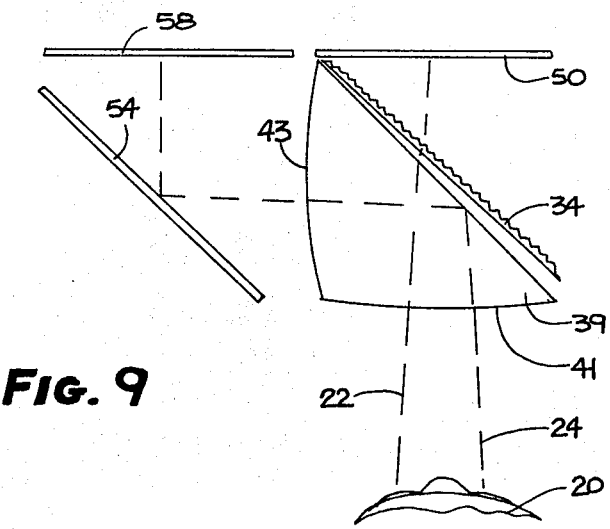
FIG. 9 illustrates the FIG. 8 embodiment with one thin grooved prism and one solid prism.

Referring now to FIG. 9, solid prism 39, can be used in substitution for either one of any thin face, grooved prism as herein described. Prism 39, as illustrated, is positioned in place of prism 36 of FIG. 8. Side 41 of prism 39 is convex to provide magnification for both images 50 and 58, as observed by viewer 20. Side 43 of prism 39 is also convex, magnifying image 58 in the same manner as lens 62 of FIG. 8. Prism 39, therefore, replaces three optical elements of FIG. 8, lenses 52 and 62, and prism 36. The system of FIG. 9 can be modified to a single prism system by eliminating thin prism 34 and relocating imaging surface 50 in its place.

Figure 10:
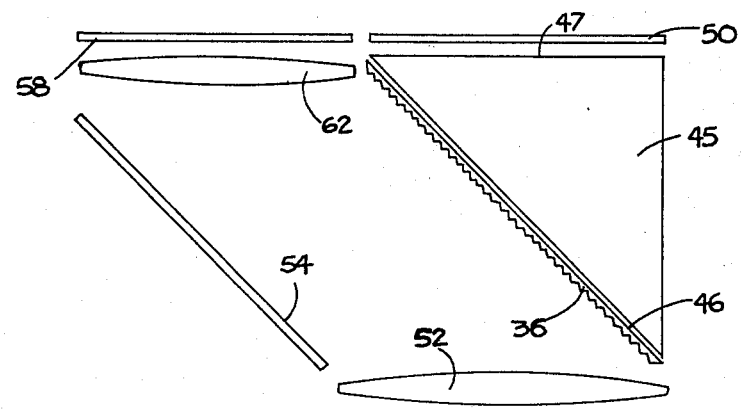
FIG. 10 illustrates the FIG. 9 embodiment with the reversal of position of the solid prism and the thin grooved prism array.

FIG. 10 illustrates the system of FIG. 8 with solid prism 45 substituted for thin prism 34. In FIG. 10, prism 45 and prism 36 are positioned with gap 46 therebetween. Left image 50 is positioned parallel to side 47 of prism 45. Magnification lens 62 is positioned at a location between image 58 and reflective means 54, an alternative to its FIG. 8 placement.

Figure 11:
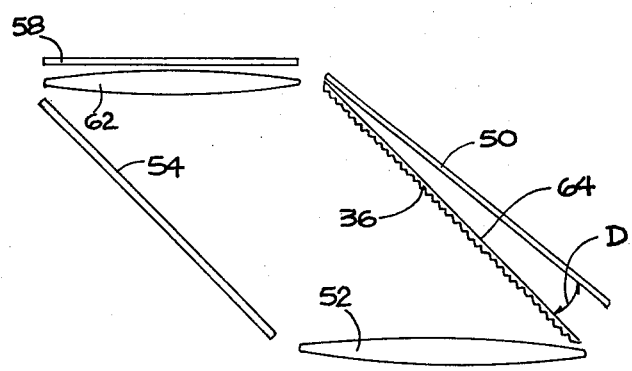
FIG. 11 illustrates the system of FIG. 8 employing only one prism.

FIG. 11 employs a one prism system similar to as described earlier in FIGS. 1 and 2, with the inclusion of reflective means 54 to visually flop image 58, eliminating the necessity of photographically flopping image 58 prior to use in the system. Prism 36 is the only prism in this embodiment. The orientation and positioning of elements 36, 52, 54 and 62 are identical to the FIG. 8 embodiment. Left stereo image 50 is positioned at an occluded angle D of between 1 degree and 15 degrees to the plano surface 64 of prism 36, to minimize any prism distortion in the single prism system. Lens 52, lens 62 and prism array 36 can be replaced by solid prism 39, as employed in FIG. 9.

FIGS. 12, 13, 14 and 15 describe distal projection and imaging embodiments which effectively eliminate the need for special process image flopping or reversing.

Figure 12:
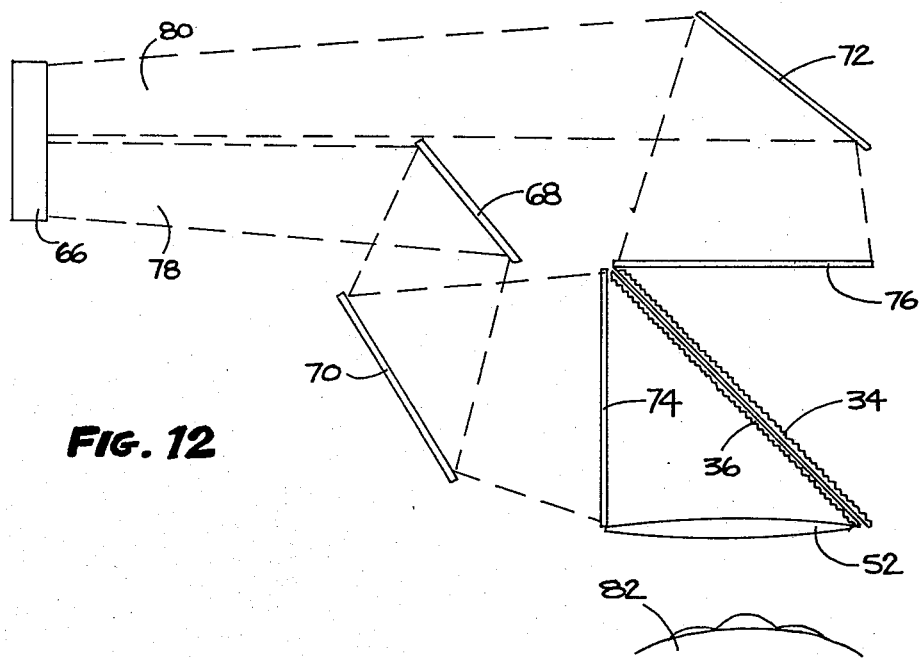
FIG. 12 illustrates a projection display system for use with a two prism array.

Referring now to FIG. 12, a pair of stereoscopic images, represented by projected image beams 78 and 80 are projected by distal imaging means 66. Right image beam 78 is projected onto reflective means 68 where it is flopped, or reversed, and then directed onto reflective means 70 where it is re-flopped back to its normal orientation and directed onto translucent viewing screen 74. Observer 82 views this image in a manner as described in FIG. 4. Since image 78 is viewed on the back side of translucent screen 74, it appears flopped, but is corrected at prism 36 and therefore appears to the observer 82 in its correct orientation. Left image 80 is projected onto reflective means 72, flopped, and then directed onto translucent screen 76. Viewed through the back side of screen 76, the flopped image appears in its correct orientation. Reflective means 68, 70, 72 are positioned in such a fashion as to render the length of travel of left image 80 and right image 78 identical.

Figure 13:
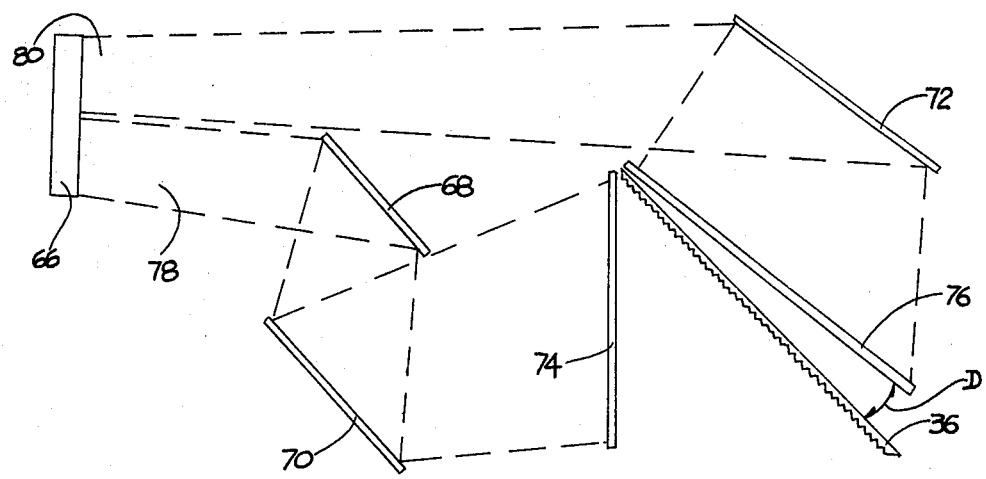
FIG. 13 illustrates the projection display of FIG. 12 with only one thin grooved prism.

FIG. 13 describes a projection system with image orientation basically as described in FIG. 12, except this embodiment employs a one prism array as described in FIGS. 1 and 2. Light translucent screen 76 is positioned at an occluded angle D of approximately ten degrees in relation to the prism 36. Reflective means 68 and 70 are positioned as described in FIG. 13. Reflective means 72 is positioned to compensate for the change in path length of right image 80 and the change in position of light translucent screen 76. It should be noted that the magnification lens 52 of FIG. 12 is not present in the FIG. 13 embodiment. This lens is a preferred feature for image viewing, but all embodiments of this invention will function without the inclusion of that lens.

Figure 14:
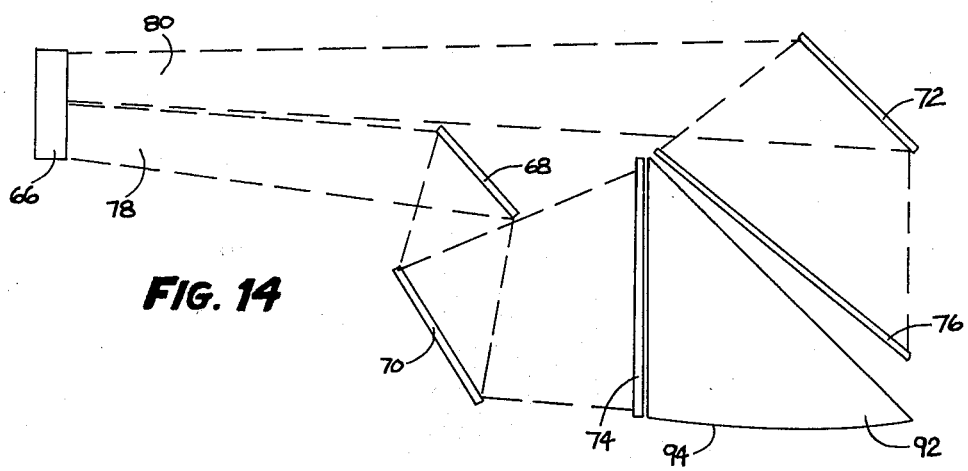
FIG. 14 illustrates the system of FIG. 13 with a solid prism.

Referring to FIGS. 13 and 14, the identical system for stereoscopic projection is illustrated except for the replacement of prism 36 in FIG. 13 with solid prism 92 in FIG. 14. Solid prism 92 can be employed in place of the thin prism as previously described herein to achieve a similar optical effect. One short side of prism 92 is illustrated with a convex surface 94. This convexity equips prism 92 with an integral magnification ability, thereby eliminating the need for the separate magnification means as illustrated elsewhere in this application, such as in FIGS. 8, 11 and 12. The convex face 94 is optional.

Figure 15:
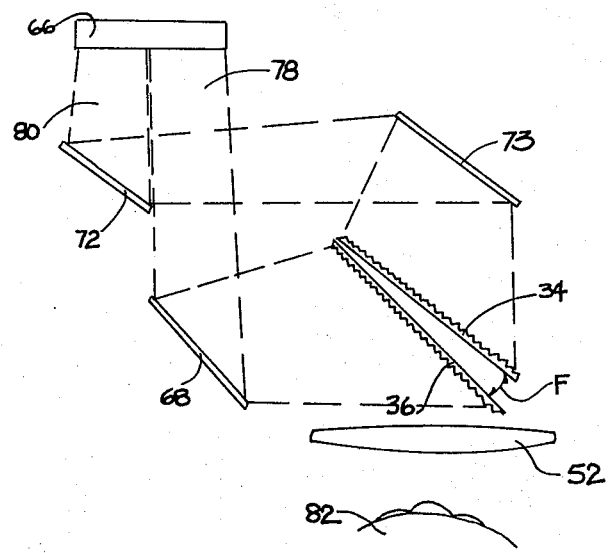
FIG. 15 illustrates a display system similar to FIG. 12 for non-projected remote images.

In FIG. 15, distal imaging means 66 is non-projecting, such as in the case of a television. Viewer 82 must therefore view the stereoscopic images 78 and 80 directly, not on a remote screen as in FIGS. 12, 13, 14. It should be noted that image beams are at an opposite orientation to FIGS. 12, 13 and 14 as they exit from imaging means 66 and that since they are viewed directly without rear projection onto any translucent screens as in FIGS. 12, 13 and 14, the reflective means orientation differs from the above FIGS. 12, 13 and 14. Right image 78 is directed via reflective means 68 onto prism 36 where it is viewed through lens 52 by viewer 82. Left image 80 is directed via reflective means 72 and 73 onto prism 34, then into prism 36, where it is viewed by viewer 82 in a fashion as described in FIG. 8. Occluded angle F of between 1 degree and 15 degrees, as described in FIG. 8, is utilized in this embodiment to eliminate ghosting as previously explained.

Figure 16:
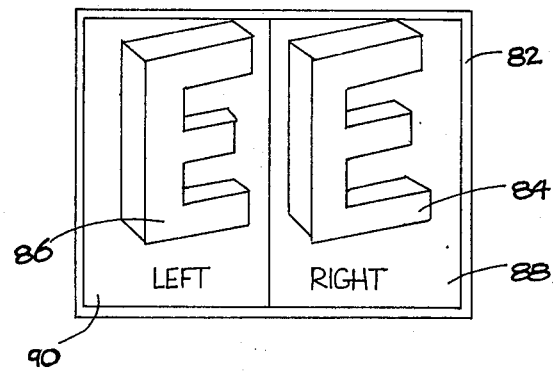
FIG. 16 illustrates a standard pair of stereoscopic images.
Figure 17:
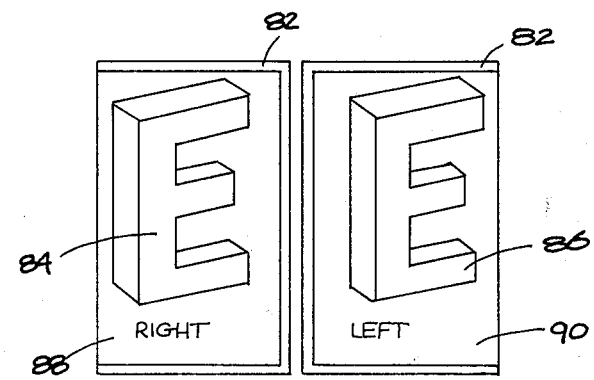
FIG. 17 illustrates a reversed stereoscopic image pair.
Figure 18:
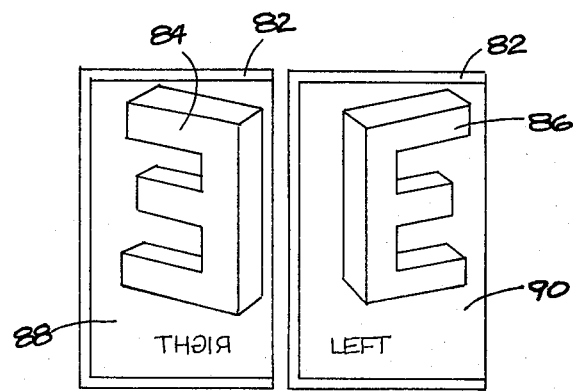
FIG. 18 illustrates a reversed stereoscopic image pair with one image flopped.

FIGS. 16, 17 and 18 demonstrate the difference in image orientation as described in this application. FIG. 16 shows an integral unit 82 which can be a standard steroscopic print or perhaps a split frame of a standard stereoscopic movie. Both images 84 and 86 are in their correct orientation on their respective fields of view 88 and 90. It can be observed that left image 86 is illustrated with more of the left field of view 90, while right image 84 is illustrated with more of the right field of view 88. This is the normal, natural orientation, primarily, that this invention has been concerned with.

FIG. 17 illustrates reversed images. The left image 86 has been positioned to the right of right image 84. This is an inconvenience in orientation for usage in a viewing system, but does not present major technical problems in film developing. It does, however, require some skill in viewer usage.

FIG. 18 shows the reversed images of FIG. 17 plus right image 84 has now also been flopped. This presents difficulty in image processing and might discourage common usage of a stereoscopic system requiring this orientation. This is the image orientation required for use in FIGS. 1, 2, 3 and 4 which is avoided by the projection and imaging system of this invention.

The invention has been described with reference to the illustrated and presently preferred embodiments. It is not intended that the invention be unduly limited by this illustration of presently preferred embodiments. Instead, it is intended that the invention be defined by the means, and their obvious equivalents, set forth in the following claims.

We claim:

1. A stereoscopic viewing system comprising:
    (a) a thin plate prism with a plano face and an opposite face bearing a plurality of parallel, spaced-apart, straight-line, V-grooves defining a plurality of straight, spaced-apart, triangular prisms that provide a viewing face;
    (b) a mirror to one side of and parallel to said thin plate prism;
    (c) a first imaging surface behind said thin plate prism, at an occluded angle of 1 degree to 15 degrees relative to said prism;
    (d) a second imaging surface in the reflected line of sight from said mirror, at an occluded angle of 40 to 60 degrees with said mirror; and
    (e) first and second stereoscopic images displayed, respectively, on said first and second imaging surfaces.

2. The stereoscopic viewing system of claim 1 including a magnification lens located between said prism and second imaging surface.

3. The stereoscopic viewing system of claim 1 including a magnification lens in front of said prism, in the line of sight of a viewer thereof.

4. The stereoscopic viewing system of claim 1 wherein said V-grooves are provided at a density from about 10 to 200 per inch.

5. The stereoscopic viewing system of claim 1 wherein said V-grooves are provided at a density of at least 50 per inch.

6. A stereoscopic viewing system for viewing a remote display of side-by-side disposed stereoscopic images which comprises:
    (a) a thin plate prism with a plano face and an opposite face bearing a plurality of parallel, spaced-apart triangular prisms;
    (b) a first mirror in the light path of one image of said images to reflect said one image directly onto one prism face; and
    (c) second and third mirrors in the light path of the other image of said images to successively reflect said other image directly onto the other prism face.

7. The stereoscopic viewing system of claim 6 for viewing projected stereoscopic images which also comprises:
    (a) a first imaging surface positioned between said first mirror and said one prism face to intercept and display one image of said projected stereoscopic images; and
    (b) a second imaging surface positioned between said third mirror and said other prism face to intercept and display the other of said images.

8. The stereoscopic viewing system of claim 7 wherein said first imaging surface is positioned at an occluded angle of 1 to 15 degrees to said prism; and said second imaging surface is positioned at an occluded angle of 40 to 60 degrees to said prism.

9. A stereoscopic viewing system comprising:
    (a) a solid triangular prism having a hypotenuse face and two short faces with an apex angle between one of said short faces and hypotenuse face from 35 to 45 degrees;
    (b) a mirror to one side of and parallel to said hypotenuse face of said prism;
    (c) a first imaging surface behind said prism, at an occluded angle of 1 degree to 15 degrees relative to said hypotenuse face of said prism;
    (d) a second imaging surface in the reflected line of sight from said mirror, at an occluded angle of 40 to 60 degrees with said mirror; and
    (e) first and second stereoscopic images displayed, respectively, on said first and second imaging surfaces.

10. The stereoscopic viewing system of claim 9 wherein at least one of said short faces of said solid prism is convex.

11. The stereoscopic viewing system of claim 9 wherein at least one of said short faces of said solid prism is concave.

12. A stereoscopic viewing system for viewing a remote display of side-by-side disposed stereoscopic images which comprises:
    (a) a solid triangular prism having a hypotenuse face and a viewing face with an apex angle between said viewing face and hypotenuse face from 35 to 45 degrees;
    (b) a first mirror in the light path of one image of said images to reflect said one image directly onto one non-viewing prism face; and
    (c) second and third mirrors in the light path of the other image of said images to successively reflect said other image directly onto the other non-viewing prism face.

13. The stereoscopic viewing system of claim 12 for viewing projected stereoscopic images which also comprises:
  (a) a first imaging surface positioned between said first mirror and said one non-viewing prism face to intercept and display one image of said projected stereoscopic images; and
  (b) a second imaging surface positioned between said third mirror and said other non-viewing prism face to intercept and display the other of said images.

14. A stereoscopic viewing system comprising:
  (a) a pair of thin plate prisms, each with a plano face and an opposite face bearing a plurality of parallel, spaced-apart, straight-line, V-grooves defining a plurality of straight, spaced-apart, triangular prisms and assembled with back-to-back plano faces;,
  (b) a mirror to one side of said assembly;
  (c) a first imaging surface behind said assembly, at an occluded angle of 40 to 60 degrees to said assembly;
  (d) a second imaging surface in the reflected line of sight from said mirror; and
  (e) first and second stereoscopic images displayed, respectively, on said first and second imaging surfaces.

15. The stereoscopic viewing system of claim 14 wherein said mirror is parallel to said assembly and said second imaging surface is beside said first imaging surface.

16. The stereoscopic viewing system of claim 14 wherein said mirror has an occluded angle to said prism assembly of 30 to 45 degrees, and said second imaging surface is located to the opposite side of said assembly relative to said mirror.

17. The stereoscopic viewing system of claim 14 including a magnification lens located between said prism assembly and second imaging surface.

18. The stereoscopic viewing system of claim 14 including a reduction lens located between said prism assembly and first imaging surface.

19. A stereoscopic viewing system for viewing a remote display of side-by-side disposed stereoscopic images which comprises:
  (a) a pair of thin plate prisms, each with a plano face and an opposite face bearing a plurality of parallel, spaced-apart, straight-line, V-grooves defining a plurality of straight, spaced-apart, triangular prisms and assembled with back-to-back plano faces;
  (b) a first mirror in the light path of one image of said images to reflect said one image directly onto one of said prism faces; and
  (c) second and third mirrors in the light path of the other image of said images to successively reflect said other image directly onto the other of said prism faces.

20. The stereoscopic viewing system of claim 19 for viewing projected stereoscopic images which also comprises:
  (a) a first imaging surface positioned between said first mirror and said first prism face to intercept and display one image of said projected stereoscopic images; and
  (b) a second imaging surface positioned between said third mirror and said second prism face to intercept and display the other of said images.

21. The stereoscopic viewing system of claim 20 wherein said V-grooves are provided at a density from about 10 to 200 per inch.

22. The stereoscopic viewing system of claim 20 wherein said V-grooves are provided at a density of at least 50 per inch.

23. The stereoscopic viewing system of claim 19 wherein said thin plate prisms are positioned with an occluded angle of 1 to 15 degrees between their plano faces.

24. A stereoscopic viewing system comprising:
  (a) a solid triangular prism having a hypotenuse face and two short faces with an apex angle between at least short face and the hypotenuse face from 35 to 45 degrees;
  (b) a thin plate prism with a plano face and an opposite face bearing a plurality of parallel, spaced-apart triangular prisms with its plano surface opposite to said hypotenuse face of said solid triangular prism;
  (c) a mirror to one side of said assembly;
  (d) a first imaging surface behind said assembly, at an occluded angle of 40 to 60 degrees to said hypotenuse face;
  (e) a second imaging surface in the reflected line of sight from said mirror; and
  (f) first and second stereoscopic images displayed, respectively, on said first and second imaging surfaces.

25. The stereoscopic viewing system of claim 24 wherein sad mirror is parallel to said hypotenuse face and said second imaging surface is beside said first imaging surface.

26. The stereoscopic viewing system of claim 24 wherein said mirror has an occluded angle to said hypotenuse face of 30 to 45 degrees, and said second imaging surface is located to the opposite side of said assembly relative to said mirror.

27. The stereoscopic viewing system of claim 24 wherein at least one of said short faces of said solid prism is convex.

28. The stereoscopic viewing system of claim 24 wherein at least one of said short faces of said solid prism is concave.

29. The stereoscopic viewing system of claim 24 wherein said thin plate prism and said solid triangular prism are positioned with an occluded angle of 1 to 15 degrees between their adjacent faces.

30. A stereoscopic viewing system for viewing a remote display of side-by-side disposed stereoscopic images which comprises:
  (a) a solid triangular prism having a hypotenuse face and two short faces with an apex angle between at least one short face and the hypotenuse face from 35 to 45 degrees;
  (b) a thin plate prism with a plano face and an opposite face bearing a plurality of parallel, spaced-apart triangular prisms with its plano surface opposite to said hypotenuse face of said solid triangular prism;
  (c) a first mirror in the light path of one image of said images to reflect said one image directly onto one non-viewing prism face; and
  (d) second and third mirrors in the light path of the other image of said images to successively reflect said other image directly onto the other of said prism faces.

31. The stereoscopic viewing system of claim 30 for viewing projected stereoscopic images which also comprises:

(a) a first imaging surface positioned between said first mirror and said first prism face to intercept and display one image of said projected stereoscopic images; and (b) a second imaging surface positioned between said third mirror and said second prism face to intercept and display the other of said images.

* * * * *